Nov. 15, 1932.   W. H. MITCHELL   1,887,845
BRAKE LINKAGE
Filed May 12, 1931
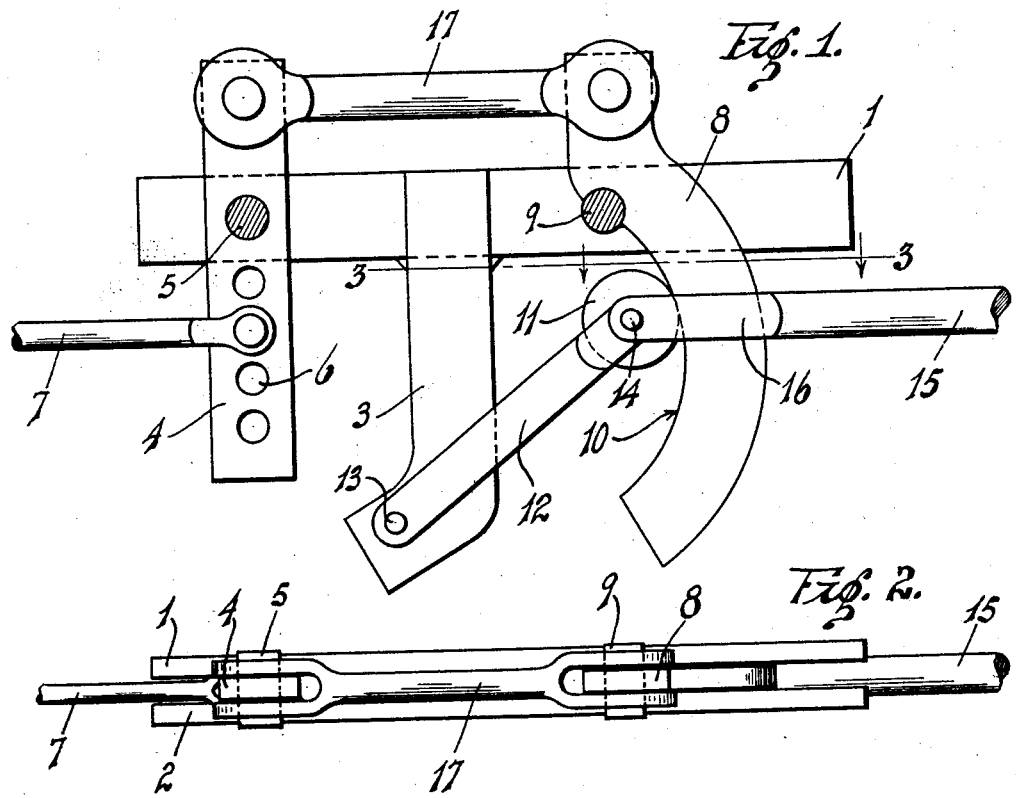
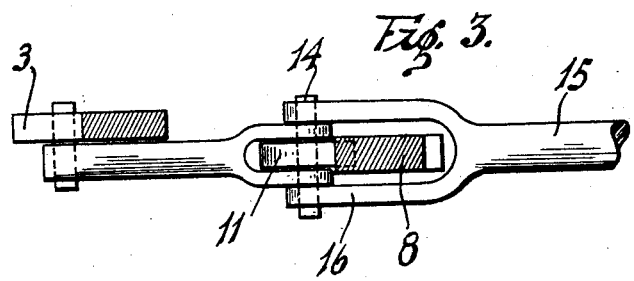
INVENTOR.
WALTER HAMILTON MITCHELL
BY
ATTORNEY.

Patented Nov. 15, 1932

1,887,845

UNITED STATES PATENT OFFICE

WALTER HAMILTON MITCHELL, OF LONG BEACH, CALIFORNIA

BRAKE LINKAGE

Application filed May 12, 1931. Serial No. 536,786.

This invention relates to a brake linkage whereby a mechanical advantage is obtained between the brake pedal rod and the brake actuating rod.

An object of my invention is to provide a brake linkage which can be easily and quickly applied to vehicle brakes, heavy machinery brakes, and the like.

Another object is to provide a brake linkage of the character stated thru which a considerable force is exerted on the brake, and by means of a relatively light force on the pedal end of the linkage.

Still another object is to provide a brake linkage which is simple in construction, and inexpensive to manufacture.

Other objects, advantages, and features of invention may appear from the accompanying drawing, the subjoined detailed description, and the appended claims.

In the drawing

Figure 1 is a side elevation of my brake linkage with one of the side plates removed.

Figure 2 is a top plan view of the brake linkage.

Figure 3 is a sectional view taken on line 3—3 of Figure 1.

Referring more particularly to the drawing, my brake linkage is supported from a pair of side plates 1—2. These plates are spaced apart a short distance and are suitably secured to a stationary part of the vehicle, if applied to a vehicle, such as a cross member of the chassis, or a part of the body. A bracket 3 is secured to the plate 1 by means of welding, or other suitable means, and this bracket extends downwardly a considerable distance for a purpose to be further described.

A lever plate 4 is pivotally mounted between the plates 1—2 upon a pin 5. The lower end of the lever is provided with a plurality of spaced holes 6 into one of which the brake pedal rod 7 extends. The brake pedal rod is of usual and well known construction and extends forwardly to the brake pedal, all of which is usual and well known. A cam plate 8 is pivotally mounted between the plates 1—2 upon a pin 9. This pin is welded to the cam plate, and is positioned as shown so that the maximum throw of the roller is obtained. The plate 8 has a cam surface 10 formed on the inner edge thereof, and a roller 11 is adapted to move over the cam surface.

A bar 12 is pivotally mounted as at 13 to the lower end of the bracket 3, the other end of the bar is formed with a clevis so as to straddle the roller 11 and the clevis attaches to the shaft 14. A brake actuating rod 15 is formed with a clevis 16 which also attaches to the shaft 14. The cam plate 8 is rocked on its pivot together with the plate 4 by means of the link 17 which is pivotally attached to the upper ends of both the cam plate 8 and the plate 4.

Thus, as the brake pedal is depressed, the rod 7 will be pulled forwardly, the plate 4 will swing on its pivot 5 and thru the link 17, the cam plate 8 will be rocked on its pivot 9. The roller 11 will move over the cam surface 10 which will pull the rod 15 so as to actuate the brakes. It will be evident that the cam surface 10 will give a material mechanical advantage so that a greater force can be exerted upon the brakes. The roller 11 on its supporting bar 12 moves very easily over the cam surface so that the entire linkage operates quietly and with a minimum of friction.

Having described my invention, I claim:

1. A brake linkage comprising a pair of spaced side plates, a lever pivotally mounted in said side plates, a brake pedal rod, means attaching said brake pedal rod to the lever, a cam plate, said cam plate being pivotally mounted between the side plates, means connecting said lever and cam plate, a roller adapted to move upon said cam plate, a brake actuating rod, and means attaching said brake actuating rod to the roller, a bracket depending from the side plates, a bar, said roller being journaled in one end of said bar, and a pin extending thru the other end of said bar and into said bracket.

2. A brake linkage comprising a pair of spaced side plates, a lever pivotally mounted in said side plates, a brake pedal rod, means attaching said brake pedal rod to the lever, a cam plate, said cam plate being pivotally mounted between the side plates, a link, said link being pivotally attached to the lever and to the cam plate, said cam plate having a cam surface formed thereon, a roller bearing against said cam surface, a brake actuating rod, means securing said brake actuating rod to the roller, a bar, said roller being journaled in one end of said bar, a bracket depending from the side plates, and a pin extending thru the bar and into the bracket whereby said bar is pivotally mounted.

In testimony whereof, I affix my signature.

WALTER HAMILTON MITCHELL.